(12) United States Patent
Roberts et al.

(10) Patent No.: US 11,028,696 B2
(45) Date of Patent: Jun. 8, 2021

(54) CERAMIC MATRIX COMPOSITE AIRFOIL REPAIR

(71) Applicant: General Electric Company, Schenectady, NY (US)

(72) Inventors: Herbert Chidsey Roberts, Middletown, OH (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 15/670,151

(22) Filed: Aug. 7, 2017

(65) Prior Publication Data
US 2019/0040742 A1  Feb. 7, 2019

(51) Int. Cl.
| | |
|---|---|
| *F01D 5/00* | (2006.01) |
| *B23P 6/00* | (2006.01) |
| *B29C 73/04* | (2006.01) |
| *F01D 5/28* | (2006.01) |
| *F01D 5/14* | (2006.01) |

(52) U.S. Cl.
CPC .............. *F01D 5/005* (2013.01); *F01D 5/147* (2013.01); *F01D 5/282* (2013.01); *F01D 5/284* (2013.01); *B23P 6/005* (2013.01); *B29C 73/04* (2013.01); *F05D 2230/10* (2013.01); *F05D 2230/23* (2013.01); *F05D 2230/80* (2013.01); *F05D 2240/10* (2013.01); *F05D 2240/24* (2013.01); *F05D 2260/36* (2013.01); *F05D 2300/6033* (2013.01)

(58) Field of Classification Search
CPC .......... B23P 6/002; B23P 6/005; B23P 6/045; F01D 5/005; F05D 2230/80; F05D 2230/72; F03D 80/50; F05B 2230/80; B29C 73/04; B29C 73/06
See application file for complete search history.

(56) References Cited

U.S. PATENT DOCUMENTS

| | | | |
|---|---|---|---|
| 2,010,569 A | 8/1935 | Sitzler | |
| 2,722,734 A | 11/1955 | Grant | |
| 5,928,448 A | 7/1999 | Daws | |
| 7,488,157 B2 | 2/2009 | Marini et al. | |
| 7,500,833 B2 | 3/2009 | Bublath et al. | |
| 7,810,237 B2 | 10/2010 | Lange et al. | |
| 7,841,834 B1 * | 11/2010 | Ryznic .................. | F04D 29/324 416/224 |
| 8,978,249 B2 | 3/2015 | Hovel et al. | |
| 8,997,836 B2 | 4/2015 | Mueller et al. | |

(Continued)

FOREIGN PATENT DOCUMENTS

EP   2777841 A1   9/2014

*Primary Examiner* — Christopher J Besler
(74) *Attorney, Agent, or Firm* — Dority & Manning, P.A.

(57) ABSTRACT

Methods for repairing composite components are provided. For instance, one exemplary method includes machining an interlocking feature into an existing component. A replacement material or core having an interlocking feature complementary to the interlocking feature of the existing component is then joined with the component. The interlocking features interlock to form a joint. The joint is then overlaid with one or more plies to rebuild the outer surface of the component and seal the joint. A bonding process can be used to chemically bond the newly joined parts together. Repaired composite components are also provided.

10 Claims, 7 Drawing Sheets

(56) References Cited

U.S. PATENT DOCUMENTS

| | | |
|---|---|---|
| 9,366,140 B2 | 6/2016 | Chamberlain |
| 2006/0175323 A1 | 8/2006 | Myers |
| 2007/0084047 A1* | 4/2007 | Lange ................... B23P 6/005 29/889.1 |
| 2013/0115091 A1* | 5/2013 | Bruck .................... F01D 5/005 416/223 R |
| 2014/0259666 A1* | 9/2014 | Baughman ........... B23K 1/0018 29/889.1 |
| 2015/0047168 A1 | 2/2015 | James et al. |
| 2016/0376893 A1* | 12/2016 | Hardwicke ............. B23P 6/005 156/249 |
| 2017/0203524 A1* | 7/2017 | Huang ................... B29C 73/02 |

\* cited by examiner

CERAMIC MATRIX COMPOSITE AIRFOIL REPAIR

FIELD

The present subject matter relates generally to repairing components of gas turbine engines. More particularly, the present subject matter relates to repair of composite airfoils of gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The turbine section includes one or more stages of a plurality of stationary nozzle airfoils and a plurality of blade airfoils attached to a rotor that is driven by the flow of combustion gases against the blade airfoils. The turbine section may have other configurations as well. Likewise, one or more of the compressors of the compressor section can include a plurality of stationary nozzle airfoils and a plurality of blade airfoils attached to a rotor that is driven by the turbine section. In addition, other sections of the gas turbine engine can include airfoils as well, such as e.g., the fan. Such airfoils typically have complex geometries. For instance, airfoils can have relatively thin sections at their trailing edges and tips. Moreover, such airfoils having complex geometries can be formed from a composite laminate (i.e., one or more layers of composite material). For instance, compressor nozzles and blades can be formed from a polymer matrix composite ("PMC") material and the turbine nozzles and blades can be formed from a ceramic matrix composite ("CMC") material.

Composite airfoils deteriorate over their service lives, and thus in some instances, require repair. The tips of blades as well as the trailing edges of nozzles typically wear the fastest. Repairing these areas has been challenging in the past due to the relatively thin cross sections of these areas. Conventional methods for repairing airfoils have included attaching new plies to the damaged area. However, such repair methods have often led to distorted parts, as the thin sections of the airfoil offer little structure to which the new plies can attach and align with the existing structure. Other conventional methods have included brazing a replacement material to the existing airfoil. Such methods typically require a melt alloy for bonding the parts together, which may, for example, affect the mechanical properties of the airfoil. Also, brazing a replacement material onto the existing airfoil has left the brazed joint particularly vulnerable to tensile and shear loads experienced by the airfoil during operation of the gas turbine engine. As a result, airfoils formed by such conventional processes are subject to faster rates of wear and deterioration than original airfoils and thus require frequent further repairs. In short, conventional methods for repairing airfoils, especially at the portions of the airfoils with relatively thin cross sections, and resulting repaired airfoils have been unsatisfactory.

Accordingly, improved methods for repairing composite components would be desirable. In particular, improved methods for repairing composite airfoils for gas turbine engines would be useful. Further, composite airfoils repaired by such improved methods would be advantageous.

BRIEF DESCRIPTION

Aspects and advantages of the invention will be set forth in part in the following description, or may be obvious from the description, or may be learned through practice of the invention.

In one exemplary embodiment of the present disclosure, a method for repairing an airfoil formed of a composite material is provided. The method includes machining an interlocking feature into the airfoil. The method also includes joining a replacement core with the airfoil. The replacement core includes an interlocking feature complementary to the interlocking feature of the airfoil. When the replacement core is joined with the airfoil, the interlocking features of the replacement core and the airfoil interlock to form a joint. The method further includes overlaying the joint with one or more plies.

In another exemplary embodiment of the present disclosure, a component for a gas turbine engine formed from a composite material is provided. The component includes an airfoil defining a chord length extending between a leading edge and a trailing edge of the airfoil. The airfoil includes an interlocking feature extending along the chord length. The component also includes a replacement core defining a chord length extending between a leading edge and a trailing edge of the replacement core. The replacement core includes an interlocking feature complementary to the interlocking feature of the airfoil and extending along the chord length of the replacement core. The interlocking feature of the airfoil and the interlocking feature of the replacement material are interlocked to form a joint. The component also includes one or more plies overlaying the joint. At least one of the one or more plies are bonded to the airfoil and the replacement material.

In a further exemplary embodiment of the present disclosure, a method for repairing a component formed from a composite material is provided. The method includes joining a replacement material with the component. The component includes an interlocking feature and the replacement material includes an interlocking feature complementary to the interlocking feature of the component. When the replacement material is joined with the component, the interlocking features of the replacement material and the component interlock to form a joint. The method also includes overlaying the joint with one or more plies. The method further includes bonding the component with the replacement material and the one or more plies with the component and the replacement material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. As used herein, the term "about" means within ten percent of the stated value.

Aspects of the present disclosure are directed to methods for repairing composite components, such as e.g., CMC airfoils of a gas turbine engine. For instance, one exemplary aspect of the present disclosure is directed to a method for repairing an airfoil for a gas turbine engine. The exemplary method includes machining an interlocking feature into the airfoil. Either prior to or at the same time as machining the interlocking feature, a damages region of the airfoil can also be removed. A replacement material or core having an interlocking feature complementary to the interlocking feature of the airfoil is then joined with the airfoil. The complementary interlocking features can be, for example, complementary dovetails. The interlocking features of the airfoil and the replacement core interlock to form a joint. The interlocking features assist in aligning the core with the airfoil and can counteract tensile and shear loads experienced by the airfoil during operation of the gas turbine engine. The joint is then overlaid with one or more plies to rebuild the outer surface of the airfoil, seal the joint, and to provide further structural integrity to the airfoil. The replacement core provides a structural component to which the plies can attach. A bonding process can be used to chemically bond the newly joined parts together. The airfoil can further undergo additional machining processes to remove any excess ply material such that the airfoil is formed to a predetermined or desired shape. Aspects of the present disclosure are also directed to repaired composite components.

Figure 1:
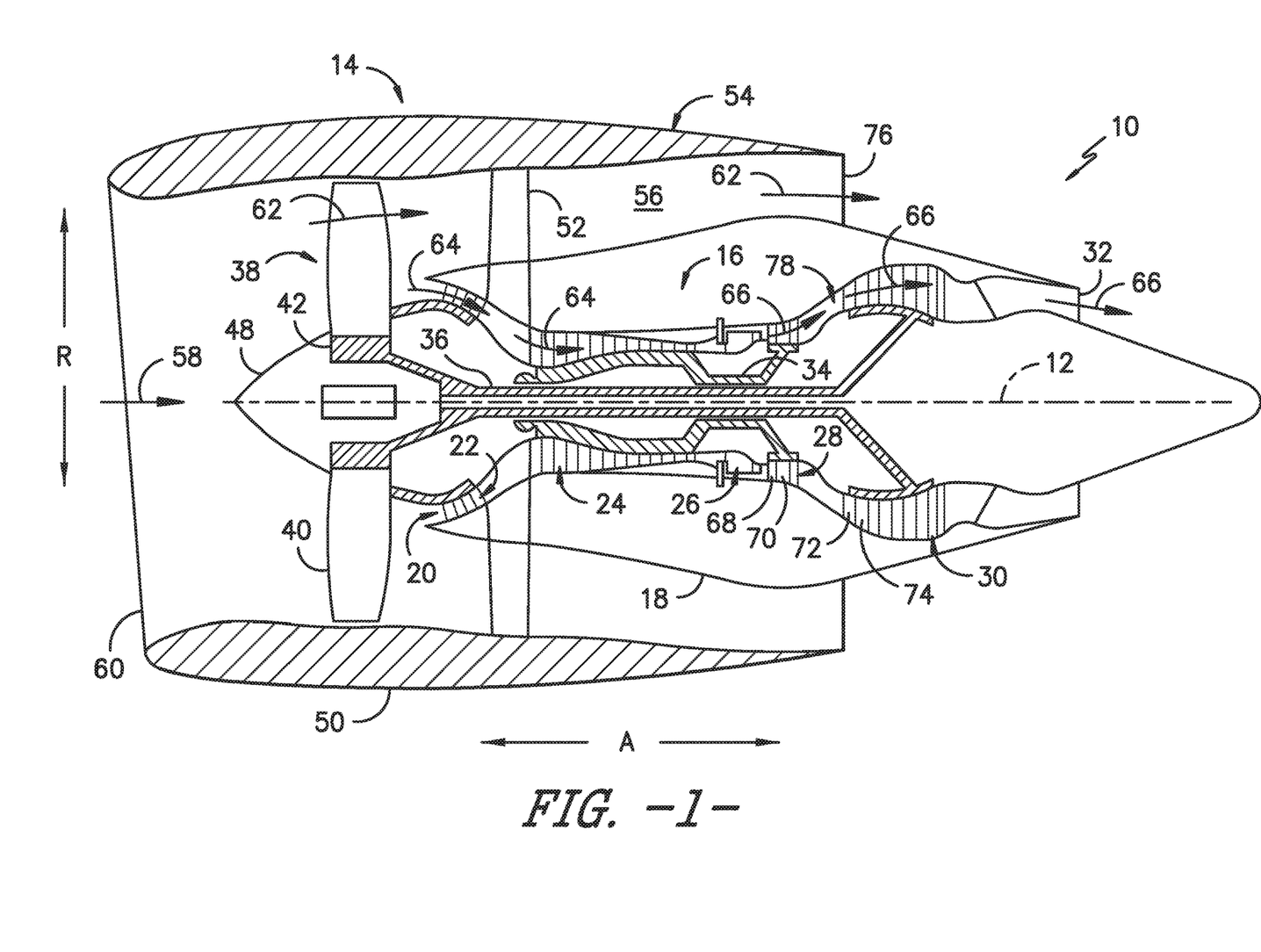
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components that include a CMC material may be used within the hot gas path 78, such as within the combustion and/or turbine sections of engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. In some embodiments, other high temperature materials and/or other composite materials may be used to form one or more components of engine 10.

Figure 2:
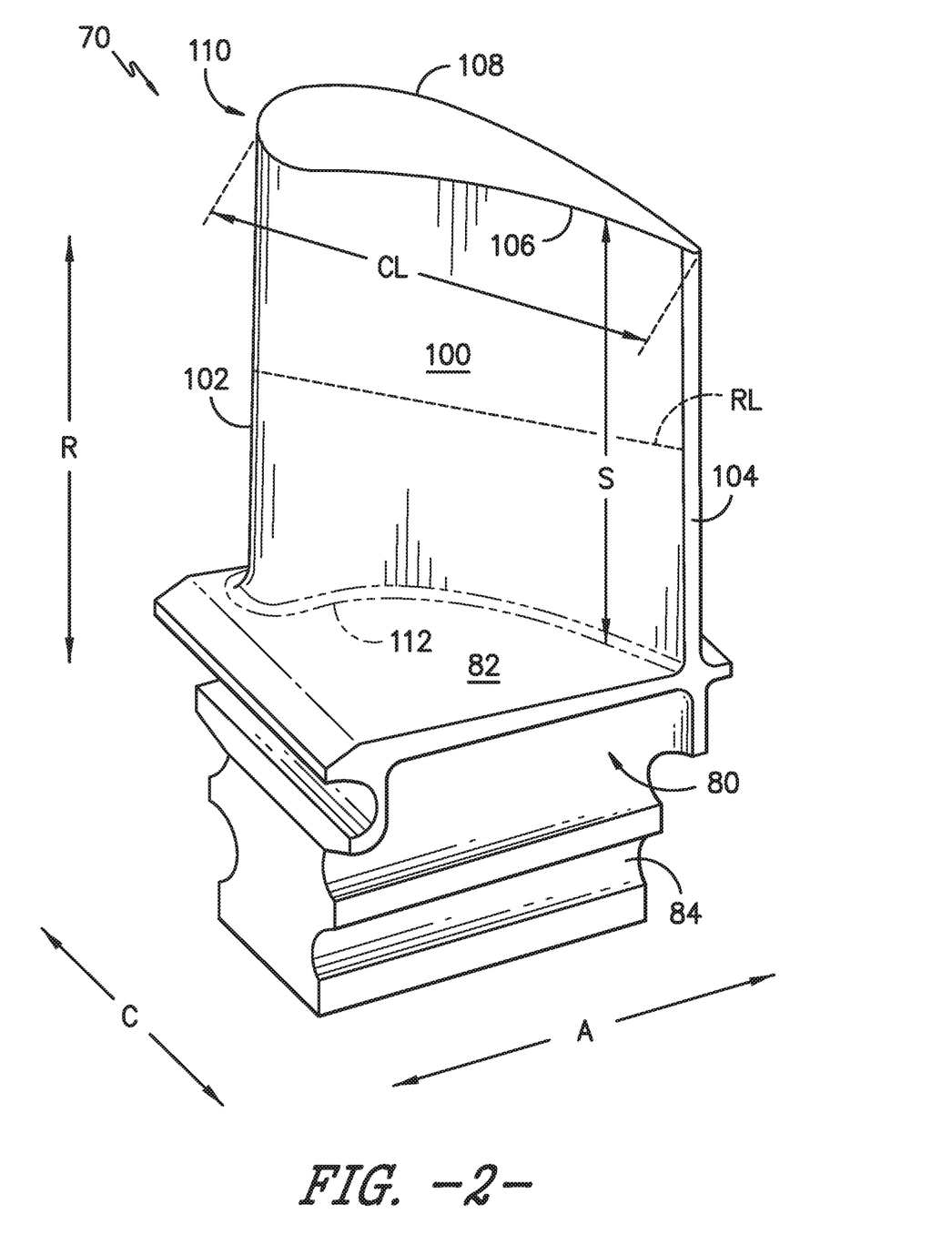
FIG. 2 provides a perspective view of an exemplary turbine blade of a gas turbine engine according to an exemplary embodiment of the present subject matter.

FIG. 2 provides an exemplary composite component depicted as a turbine blade for a gas turbine engine, such as e.g., one of the HP turbine rotor blades 70 of the turbofan engine 10 of FIG. 1. Although the composite component is depicted as a turbine blade for use in a turbine blade assembly, in other exemplary embodiments, the composite component can be a blade configured for use in a fan blade assembly, a compressor blade assembly, or any other suitable application. Moreover, for this embodiment, the turbine blade 70 is formed from a CMC material, such as e.g., silicon carbide fibers embedded in a silicon carbide matrix (SiC/SiC). Although blade 70 is depicted as being formed from a CMC material, in other exemplary embodiments, various blades of a gas turbine engine can include other matrix materials, such as epoxy materials (e.g., for fans), polymer composites (e.g., for compressors), or any other suitable matrix material.

As shown in FIG. 2, the turbine blade 70 includes an airfoil 100 against which the flow of hot combustion gases 66 (FIG. 1) are directed. The airfoil 100 includes a leading edge 102, a trailing edge 104, a pressure side wall 106, and a suction side wall 108 opposite the pressure side wall 106. The pressure side wall 106 is connected to the suction side wall 108 at leading edge 102 and trailing edge 104. The airfoil 100 further includes a tip 110 and a root 112 connected by pressure side wall 106, suction side wall 108, leading edge 102, and trailing edge 104. The airfoil 100 has a span S extending between the root 112 and the tip 110 of the airfoil 100 along the radial direction R and a chord length CL extending between the leading edge 102 and the trailing edge 104. A mid-span reference line RL is defined midway between the root 112 and the tip 110 along the span S of the airfoil 100. As further shown in FIG. 2, the airfoil 100 is connected to a shank 80. The shank 80 includes a platform 82 and a dovetail 84. The turbine blade 70 can be mounted to a turbine disk (not shown) by engaging the dovetail 84 within a slot having a complementary geometry (not shown). The airfoil 100 is connected at its root 112 to the platform 82.

During operation of the gas turbine engine 100, various airfoils, such as e.g., the turbine blade 70 of FIG. 2, compressor blades, other turbine blades, compressor stator vanes, turbine nozzles or stator vanes, fan blades, etc. are subjected to extreme pressures and/or temperatures, causing deterioration of the airfoils over time. Moreover, the airfoils can further be degraded or worn by foreign object debris (FOD). For example, the fan blades 40 are particularly vulnerable to FOD as the fan 134 is positioned at the inlet 156 of the gas turbine engine 100 (See FIG. 1). In some instances, damaged or deteriorated airfoils are removed from the engine and undergo a repair process.

Figure 3:
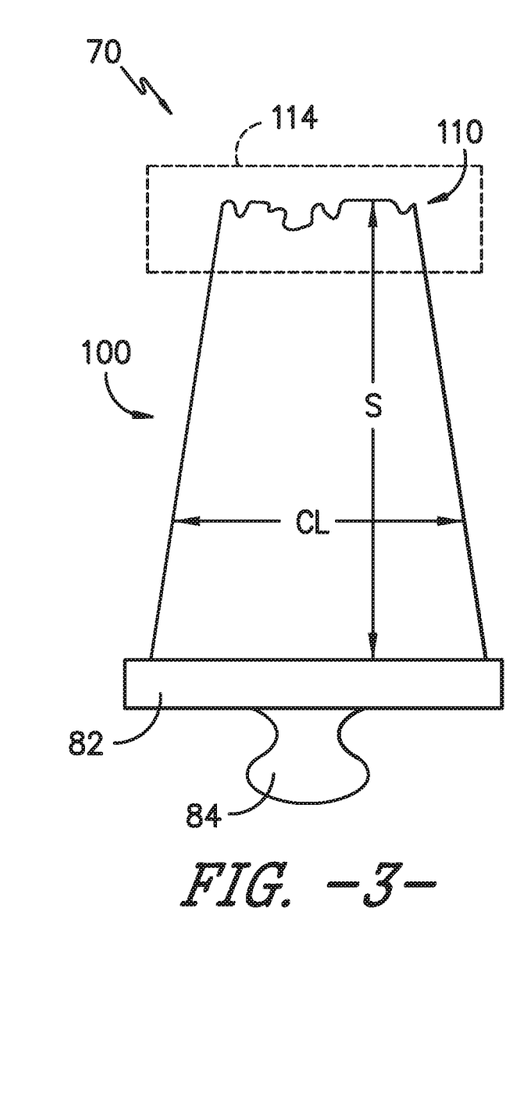
FIG. 3 provides an exemplary airfoil having a damaged region according to an exemplary embodiment of the subject matter.
Figure 4:
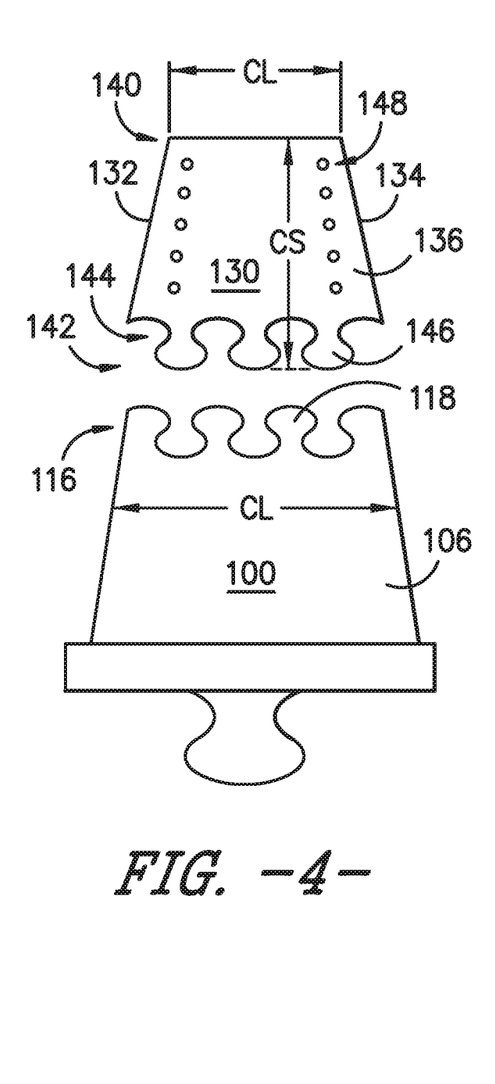
FIG. 4 provides the airfoil of FIG. 3 with the damaged region removed and having an interlocking feature formed into the airfoil as well as a replacement core having an interlocking feature according to an exemplary embodiment of the present subject matter.
Figure 5:
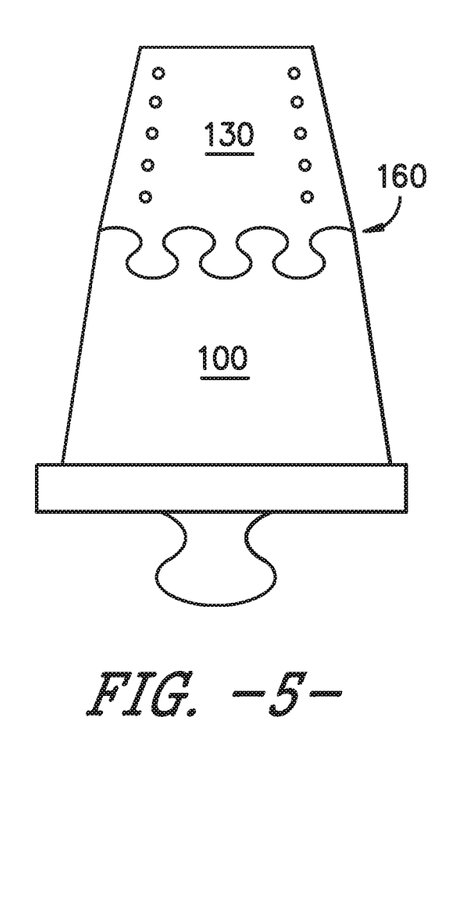
FIG. 5 provides the airfoil joined with the replacement core according to an exemplary embodiment of the present subject matter.
Figure 6:
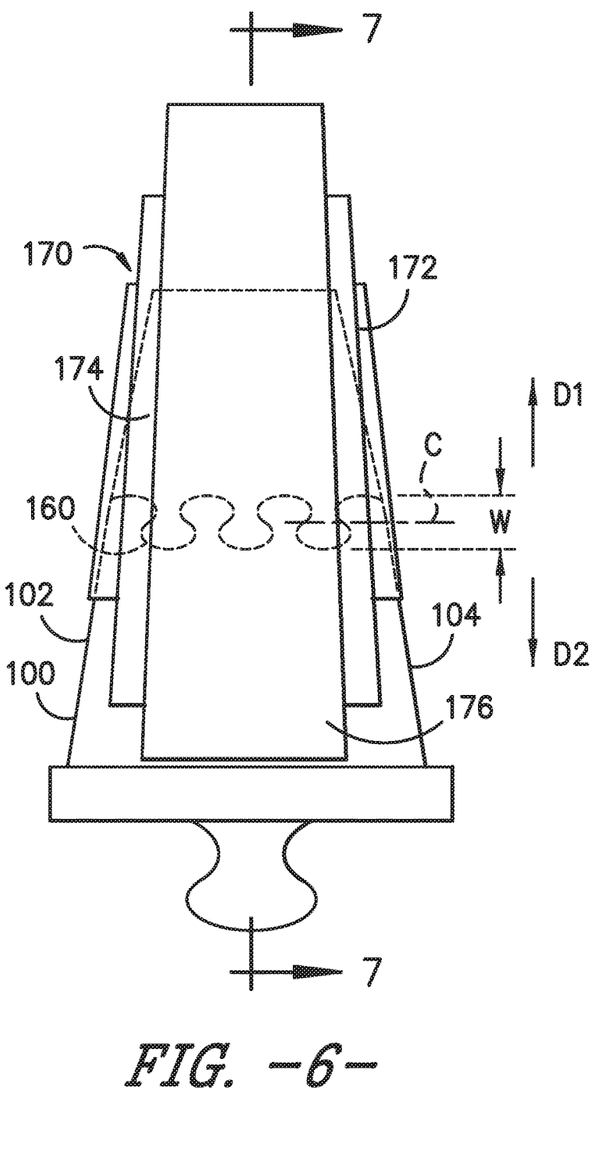
FIG. 6 provides the airfoil of FIG. 3 depicting plies covering a joint according to an exemplary embodiment of the subject matter.
Figure 7:
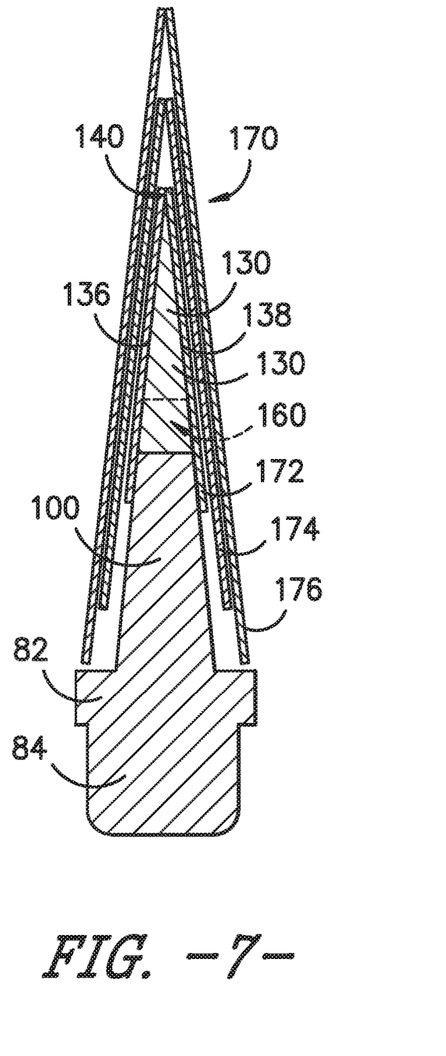
FIG. 7 provides a cross-sectional view of the turbine blade of FIG. 3 taken along line 7-7 of FIG. 6 according to an exemplary embodiment of the present subject matter.

FIGS. 3 through 7 provide an exemplary method for repairing a damaged airfoil, such as e.g., the turbine blade 70 of FIG. 2. In particular, FIG. 3 provides an exemplary airfoil 100 having a deteriorated or damaged region 114. FIG. 4 provides the airfoil 100 with the damaged region 114 removed and depicting the airfoil 100 having an interlocking feature 116. FIG. 4 further depicts a replacement material or core 130 having an interlocking feature 144 configured to interlock with the interlocking feature 116 of the airfoil 100 to form a joint 160. FIG. 5 provides the airfoil 100 joined with the replacement core 130. FIG. 6 provides the airfoil 100 joined with the replacement core 130 and depicts plies 170 overlaying the joint 160. FIG. 7 provides a cross-sectional view of the airfoil 100 taken along line 7-7 of FIG. 6 according to an exemplary embodiment of the present subject matter.

As shown in FIG. 3, the airfoil 100 has experienced significant deterioration, and more particularly, the airfoil 100 has experienced significant abrasion or wear along the tip 110 of the airfoil 100. Airfoils for gas turbine engines can experience a wide variety of damage types or failures, including microstructural change, cracks, abrasion, deformation, and entire breakages. Such deterioration negatively affects engine performance and efficiency. As noted above, in some instances, it is desirable to repair such deteriorated airfoils.

As shown in FIG. 4, interlocking feature 116 is shown machined into the airfoil 100, and by machining the interlocking feature 116 into the airfoil 100, the damaged region 114 (FIG. 3) is removed. The interlocking feature 116 can be cut or machined into the airfoil 100 and the damaged region 114 can be removed by any suitable material removal process, such as e.g., a cutting process. Although the damaged region 114 is described as being removed at the same time as the machining of the interlocking feature 116 for this embodiment, in some embodiments, the damaged region 114 can be removed prior to forming the interlocking feature 116 into the airfoil 100. In such embodiments, for example, the damaged region 114 can be removed by making a straight line cut across the chord length CL of the airfoil 100. The interlocking feature 116 can then be machined into the newly formed straight edge. This may facilitate alignment of the cutting relative to the airfoil such that the interlocking feature 116 can be machined high accuracy.

Referring still to FIG. 4, for this embodiment, the interlocking feature 116 machined into the airfoil 100 extends along the chord length CL of the airfoil 100. Moreover, for this embodiment, the interlocking feature 116 of the airfoil 100 is a series of dovetails 118 spaced apart along the chord length CL. Each dovetail 118 has a thickness extending along the circumferential direction C between the pressure side 106 and the suction side 108 (FIG. 2) of the airfoil 100.

In some embodiments, prior to machining, the airfoil 100 defines a span S extending between root 112 and tip 110 of the airfoil 100 and mid-span reference line RL is defined midway between root 112 and tip 110 (e.g., as shown in FIG. 2). For this embodiment, when machining the interlocking feature 116 into the airfoil 100, the interlocking feature 116 is machined into the airfoil 100 between about the reference line RL and root 112. By machining the interlocking feature 116 between about the reference line RL and root 112, there is a higher probability that the damaged region 114 has been completely removed and thus a degree of safety is achieved. In some instances, structural cracks in the airfoil 100 can extend from the tip 110 and propagate along the span S the airfoil 100. Accordingly, machining the interlocking feature 116 between about the reference line RL and root 112 can better ensure that the damaged region 114 has been completely removed. In addition, by machining the interlocking feature 116 between about the reference line RL and root 112, as will be explained more fully below, the core span CS or length of the replacement core 130 is increased and thus there is more attachment area for the one or more plies 170 to attach to the replacement core 130. Thus, greater structural rigidity can be achieved. As used in the context of this paragraph, the span S is indicative of an original span S of the airfoil without damage (e.g., as shown in FIG. 2).

In some embodiments, prior to machining, the airfoil 100 defines a span S extending between root 112 and tip 110 of the airfoil 100 and mid-span reference line RL is defined midway between root 112 and tip 110 (e.g., as shown in FIG. 2). For this embodiment, when machining the interlocking feature 116 into the airfoil 100, the interlocking feature 116 is machined into the airfoil 100 a distance from the tip 110 that is at least about twenty percent (20%) of the span S. By machining the interlocking feature 116 at least a distance of twenty percent (20%) of the span S, it is ensured that the replacement core 130 has a sufficient attachment area for the one or more plies 170 to attach to the replacement core 130. In yet some further embodiments, when machining the interlocking feature 116 into the airfoil 100, the interlocking feature 116 is machined into the airfoil 100 a distance from the tip 110 that is at least about ten percent (10%) of the span S, at least about fifteen percent (15%) of the span S, at least about thirty percent (30%) of the span S, or at least about forty percent (40%) of the span S. As used in the context of this paragraph, the span S is indicative of an original span S of the airfoil without damage (e.g., as shown in FIG. 2).

As further shown in FIG. 4, replacement core 130 is positioned for joining the existing airfoil 100. Replacement core 130 includes a leading edge 132, a trailing edge 134, a pressure side wall 136, and a suction side wall 138 (FIG. 7) opposite the pressure side wall 136. The pressure side wall 136 is connected to the suction side wall at leading edge 132 and trailing edge 134. Replacement core 130 further includes a tip end 140 and a connection end 142 connected by pressure side wall 136, suction side wall 138, leading edge 132, and trailing edge 134. The replacement core 130 has a core span CS extending between the tip end 140 and the connection end 142 and a chord length CL extending between the leading edge 132 and the trailing edge 134 of the replacement core 130. As shown in FIG. 4, the chord length CL of the replacement core 130 can vary along the core span CS. The replacement core 130 can be, for example, any suitable composite material, such as e.g., a CMC, PMC, or other composite material. The replacement core 130 can be formed of the same material as the airfoil 100 to which it is configured to be attached. In this way, the replacement core 130 can be formed of a complementary material to the airfoil 100. For instance, if the airfoil 100 is a PMC material configured for use in the compressor section of a gas turbine engine, the replacement core 130 can likewise be formed of a PMC material. Similarly, if the airfoil 100 is a CMC material configured for use in the turbine section of a gas turbine engine, the replacement core 130 can be formed of a CMC material.

In addition, with reference still to FIG. 4, the replacement core 130 includes an interlocking feature 144 that is complementary to the interlocking feature 116 of the airfoil 100. Accordingly, for this embodiment, the interlocking feature 144 of the replacement core 130 is also a series of dovetails 146 spaced apart along the chord length CL of the replacement core 130. For this embodiment, the airfoil 100 includes four dovetail portions or rounded tenons and three slots or mortises. The replacement core 130, on the other hand, includes three dovetail portions or rounded tenons and four slots or mortises, with the end slots or mortises being a half slot or mortise.

Although the interlocking features 116, 144 are depicted as having dovetail configurations, the interlocking features 116, 144 of the airfoil 100 and replacement core 130 can be any suitable mechanical feature that allows the airfoil 100 to interlock with the replacement core 130. For instance, as shown in FIGS. 8 through 10, further exemplary embodiments of interlocking features 116, 144 are provided.

Figure 8:
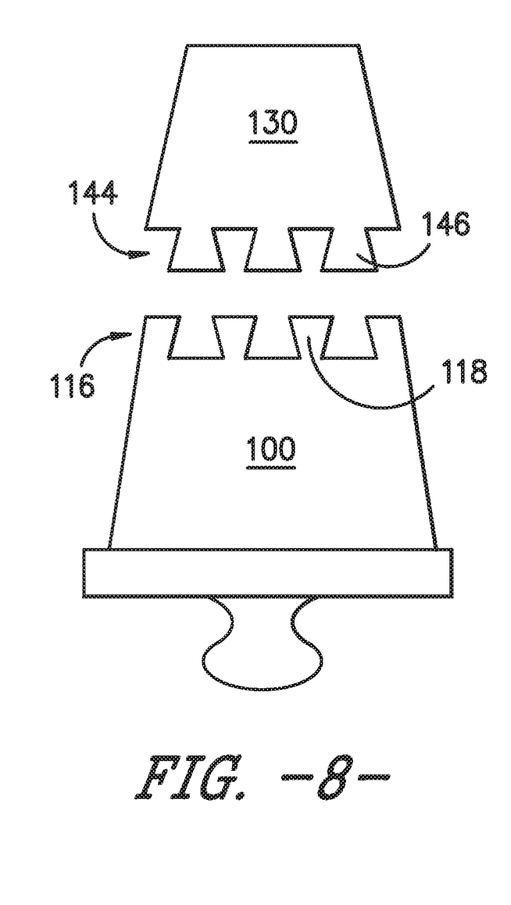
FIG. 8 provides an airfoil having an interlocking feature configured as a dovetail configuration as well as a replacement core having an interlocking feature configured as a dovetail configuration complementary to the interlocking feature of the airfoil according to an exemplary embodiment of the present subject matter.

FIG. 8 provides airfoil 100 having an interlocking feature 116 configured as a dovetail configuration 118 as well as a replacement core having an interlocking feature 144 configured as a dovetail configuration 146 complementary to the interlocking feature 116 of the airfoil 100. However, in the embodiment of FIG. 8, the tenons are flaring tenons as opposed to rounded tenons as shown in FIG. 4. The slots or mortises are likewise configured to receive the flaring tenons.

Figure 9:
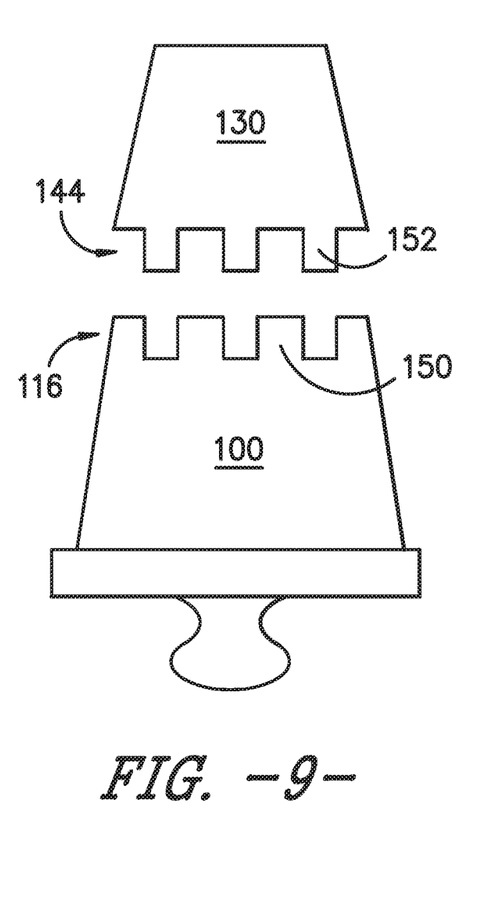
FIG. 9 provides an airfoil having an interlocking feature configured as a finger configuration as well as a replacement core having an interlocking feature configured as a finger configuration complementary to the interlocking feature of the airfoil according to an exemplary embodiment of the present subject matter.

FIG. 9 provides airfoil 100 having interlocking feature 116 configured as a series of comb or finger projections 150 as well as replacement core 130 having interlocking feature 144 configured as a series of finger projections 152 complementary to the finger projections 150 of the airfoil 100.

Figure 10:
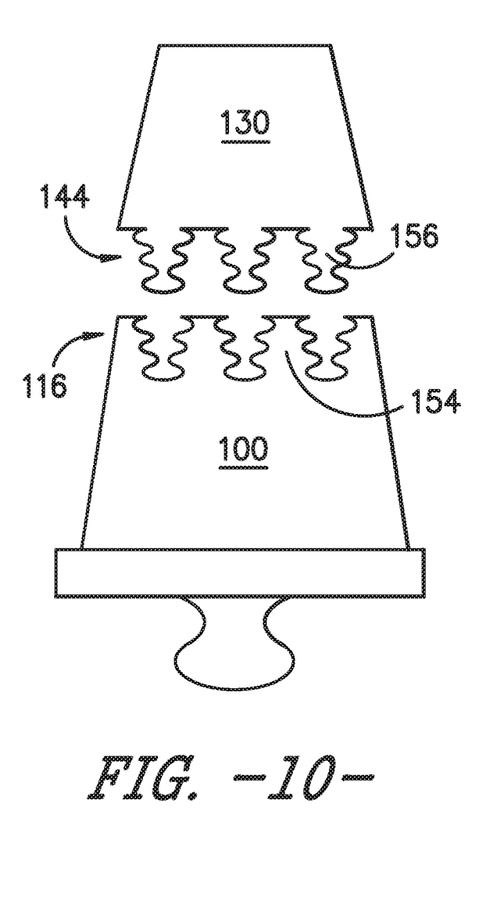
FIG. 10 provides an airfoil having an interlocking feature configured as a fir tree configuration as well as a replacement core having an interlocking feature configured as a fir tree configuration complementary to the interlocking feature of the airfoil according to an exemplary embodiment of the present subject matter.

FIG. 10 provides airfoil 100 having interlocking feature 116 configured as fir trees 154 as well as replacement core 130 having interlocking feature 144 configured as fir trees 156. As shown, the fir trees 154, 156 and slots or mortises spacing the fir trees apart from one another along the respective chord length CL of the airfoil 100 and replacement core 130 are complementary to one another. It will be appreciated that interlocking features 116, 144 can take other suitable configurations.

Returning to FIGS. 3 through 7 and particularly to FIG. 4, as shown, the replacement core 130 defines a plurality of cooling holes 148. For this embodiment, the cooling holes 148 are positioned proximate the trailing edge 134 of the replacement core 130. In other embodiments, cooling holes 148 can be positioned in any suitable location for cooling the replacement core 130. For instance, cooling holes 148 can be positioned along the tip end 140 of the replacement core 130. As the trailing edge of airfoils can become particularly hot during operation of the engine, cooling holes 148 can be provided to receive a cooling fluid and cool such trailing edges. Composite airfoils, particularly CMC composite airfoils, can be brittle and thus machining cooling holes into a relatively thin cross section of such airfoils can be challenging, as cracks and other damage to airfoil can occur during formation of such cooling holes. By providing preformed cooling holes 148 in the replacement core 130, the repaired airfoil can receive the benefit of having one or more cooling passages without being subjected to machining into the brittle outer layers of the airfoil.

As shown in FIG. 5, by interlocking the interlocking feature 116 of the airfoil 100 and the interlocking feature 144 of the replacement core 130, the airfoil 100 can be connected to or otherwise joined to the replacement core 130 to form joint 160. The interlocking features 116, 144 provide for secure attachment of the placement core 130 to the airfoil 100 and also assist with alignment of the replacement core 130 with the airfoil 100. In particular, for rotating airfoils, the interlocking features 116, 144 counteract tensile forces by preventing the replacement core 130 from flying radially outward as the blades are rotated about during operation and also counteract shear forces by preventing the replacement core 130 from sliding along the circumferential direction C relative to the airfoil 100 as the airfoils are rotated about. For stationary airfoils, the interlocking features 116, 144 counteract shear forces by preventing mass flows through the engine from shearing or sliding the replacement core 130 relative to the existing airfoil 100. Moreover, the interlocking features 116, 144 also counteract tensile forces as well.

For this embodiment, to interlock the replacement core 130 with the airfoil 100, the rounded tenons of the dovetail configuration 118 of the airfoil 100 are inserted or slid into the slots or mortises of the dovetail configuration 146 of the replacement core 130. Likewise, the rounded tenons of the dovetail configuration 146 of the replacement core 130 are inserted or slid into the slots or mortises of the dovetail configuration 118 of the airfoil 100. By interlocking replacement core 130 to the airfoil 100, the tensile and shear loads experienced by the replacement core 130 during operation of the gas turbine engine can be transferred to the existing airfoil 100. Moreover, as described further below, the replacement core 130 provides a structure to which plies 170 can be attached.

In some embodiments, after joining the airfoil 100 with the replacement core 130, the joined components can optionally undergo one or more bonding processes such that the existing airfoil 100 chemically bonds with the replacement core 130. For example, the joined components can be inserted into an autoclave for a predetermined time or until the joined components reach a predetermined temperature.

As shown in FIGS. 6 and 7, the airfoil 100 is joined with the replacement core 130 at joint 160 via their respective interlocking features 116, 144 in a manner described above. After being joined, the joint 160 is covered or overlaid with composite plies 170 to rebuild and recontour the complex outer surfaces of the airfoil 100. In addition, the plies 170 are overlaid over the joint 160 to provide shear strength to the repaired airfoil and act to seal the joint 160.

For this embodiment, the laminate of plies 170 overlaying the joint 160 include a first ply layer 172, a second ply layer 174, and a third ply layer 176. Although three ply layers are shown in FIGS. 6 and 7, the laminate of plies 170 can include more than three ply layers or less than the three ply layers. As shown particularly in FIG. 7, at least one of the plies 170 overlaying the joint 160, e.g., one of the plies of the first ply layer 172, is connected to both the replacement core 130 and the airfoil 100. In some embodiments, as shown in FIG. 7, one ply 170 can overlay the joint 160 and can connect to both the replacement core 130 and the airfoil 100 along the pressure side 136 of the airfoil 100 and one ply 170 can overlay the joint 160 and can connect to both the replacement core 130 and the airfoil 100 along the suction side 138 of the airfoil 100. As shown further in FIGS. 6 and 7, after the first ply layer 170 is laid over the joint 160, for this embodiment, plies 170 forming the second ply layer 174 and the third ply layer 176 are then overlaid on top of the first ply layer 172. The layers of plies 170 can be laid up such that the predetermined geometry (i.e., the desired shape) of the airfoil 100 can be formed.

First ply layer 172 can be made up of multiple plies 170 or in some embodiments can be made of a single ply 170 (i.e., a ply can be wrapped around the tip end 140 of the replacement core and can extend along the pressure and suction sides 136, 138 of the airfoil 100. As shown in FIG. 7, for this embodiment, the first ply layer 172 is made up of multiply plies 170. One ply 170 of the first ply layer 172 extends along the pressure side 136 and overlays joint 160. The ply 170 is attached to or connected with both the existing airfoil 100 and the replacement core 130. Proximate the tip end 140 of the replacement core 130, the ply 170 is joined or mates with a second ply 170 of the first ply layer 172. The second ply 170 extends along the suction side 138 and overlays joint 160. The second ply 170 is attached to or connected with both the existing airfoil 100 and the replacement core 130 as shown. In this way, the joint 160 is sealed by the plies 170 of the first ply layer 172, and in addition to the mechanically interlocking, the replacement core 130 is securely attached to the airfoil 100 by the plies 170, particularly after the repaired airfoil undergoes a suitable bonding process as described more fully herein. Likewise, the second ply layer 174 and the third ply layer 176 can be made up of multiple plies 170 as shown in FIG. 7 or in some embodiments can be made of a single ply 170. The additional ply layers 174, 176 can further seal the joint 160, provide additional structural rigidity to counteract tensile and shear loads, and can form the repaired airfoil to a predetermined geometry or desired shape. There need not be the same amount of ply layers on the pressure and suctions sides 136, 138 of the airfoil 100. Moreover, the plies 170 can have different lengths as shown in FIG. 7.

In some embodiments, to ensure secure attachment of the plies 170 to the airfoil 100 and the replacement core 130, one or more of the plies 170 can overlay the joint 160 in the following manner. As shown in FIG. 6, the joint 160 defines a joint width W. The joint width W defines a center C. In some embodiments, at least one of the plies 70 extends from the center C of the joint width W in a first direction D1 a distance equal to the joint width W and extends from the center C of the joint width W in a second direction D2 a distance equal to the joint width W, the first direction D1 opposite the second direction D2.

After overlaying the plies 170 over joint 160, in the event there is excess material, the plies 170 and/or other parts of the repaired airfoil can be machined such that the repaired airfoil is shaped to a predetermined geometry or desired shape of the airfoil 100. Any suitable machining process can be used to machine the excess material from the plies 170, such as e.g., any suitable cutting process.

In yet other embodiments, after joining the airfoil 100 with the replacement core 130 and thereafter covering the joint 160 with plies 170, the joined components and now attached plies can collectively undergo one or more bonding processes such that the existing airfoil 100 chemically bonds with the replacement core 130 and the plies 170. In particular, in some embodiments, after the plurality of plies 170 are laid up or overlaid over the joint 160, the preform, reshaped airfoil is cured to produce a single piece, unitary composite component, which is then fired and subjected to densification, e.g., silicon melt-infiltration, to form a final unitary composite structure.

For instance, the repaired airfoil preform can be processed in an autoclave to produce a green state unitary repaired airfoil. Then, the green state repaired airfoil can be placed in a furnace to burn out excess binders or the like and then can be placed in a furnace with a piece or slab of silicon and fired to melt infiltrate the repaired airfoil with at least silicon. More particularly, for the repaired airfoil formed from CMC plies of prepreg tapes that are produced as described above, heating (i.e., firing) the green state component in a vacuum or inert atmosphere decomposes the binders, removes the solvents, and converts the precursor to the desired CMC material. The decomposition of the binders results in a porous CMC body; the body may undergo densification, e.g., melt infiltration (MI), to fill the porosity. In one example, where the green state repaired airfoil is fired with silicon, the repaired airfoil can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC repaired airfoil.

In some embodiments, the final unitary structure may be finish machined, e.g., to bring the structure within tolerance, to shape the repaired airfoil to a predetermined geometry or desired shape, and/or add an environmental barrier coating (EBC) to the unitary repaired airfoil, e.g., to protect the repaired airfoil from the hot combustion gases 66 (FIG. 1). It will be appreciated that other methods or processes of forming composite components, such as unitary composite repaired airfoil, can be used as well.

Figure 11:
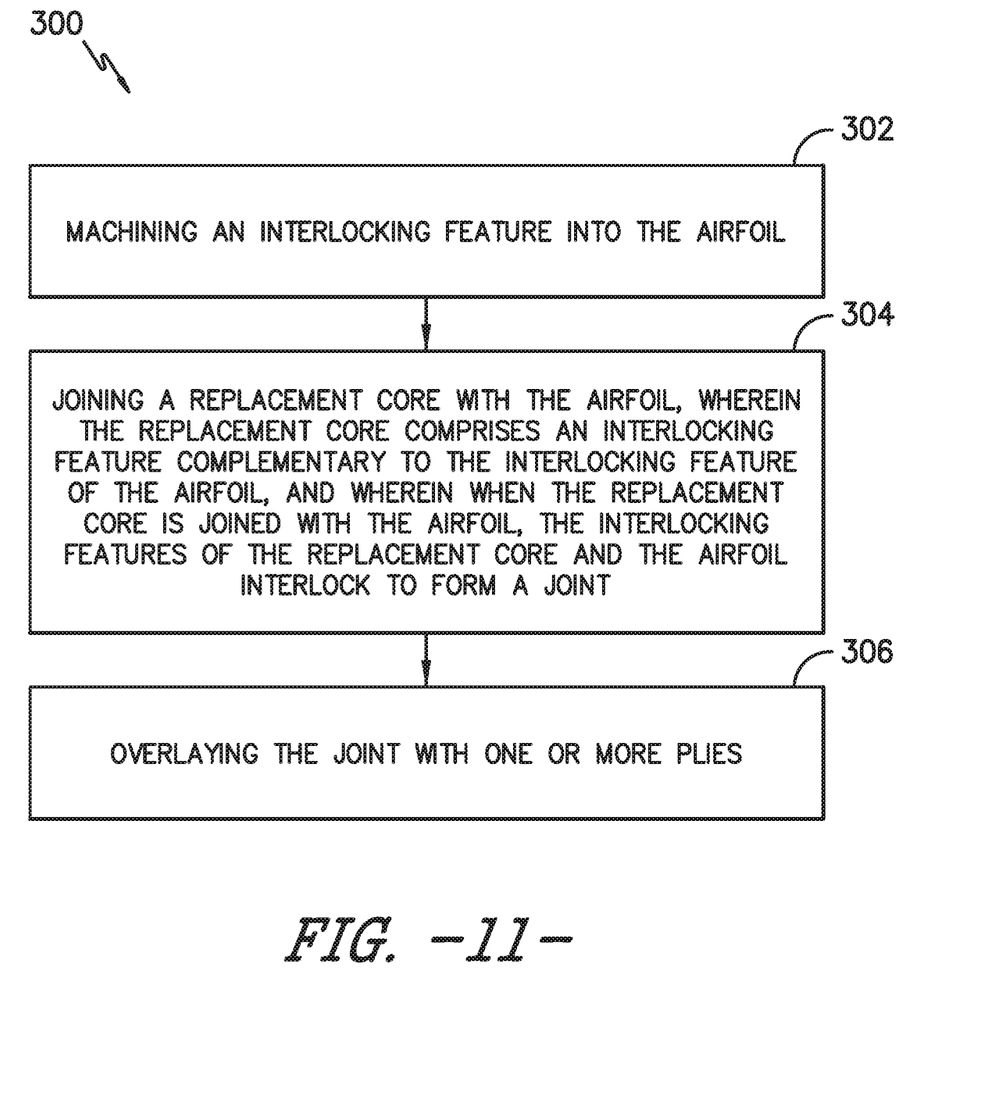
FIG. 11 provides a flow diagram of an exemplary method according to an exemplary embodiment of the present subject matter.

FIG. 11 provides a flow diagram of an exemplary method according to an exemplary embodiment of the present subject matter. In particular, FIG. 11 provides a flow diagram for a method for repairing an airfoil formed of a composite material, such as e.g., a CMC material.

At (302), the method (300) includes machining an interlocking feature into the airfoil. For instance, the interlocking feature can be the interlocking feature 116 shown and described herein. For example, the interlocking feature 116 can be dovetails 118 (rounded as shown in FIG. 4 or flaring as shown in FIG. 8), finger projections 150 as shown in FIG. 9, fir trees 154 as shown in FIG. 10, a combination of the foregoing, etc.

In some implementations, prior to machining the interlocking feature into the airfoil, the airfoil defines a deteriorated region. In such implementations, during machining, the method includes removing the deteriorated region from the airfoil. This can be done simultaneously or in steps. For instance, as noted above, the airfoil can first be cut along a straight edge to remove the deteriorated region and to provide easier access for cutting the interlocking feature into the airfoil.

In some further implementations, prior to machining, the airfoil defines a span extending between a root and a tip of the airfoil. In such implementations, a reference line is defined midway between the root and the tip. During machining the interlocking feature into the airfoil, the interlocking feature is machined into the airfoil between about the reference line and the root.

In yet other implementations, the airfoil defines a span extending between a root and a tip of the airfoil, the span indicative of an original span of the airfoil without damage or deterioration. In such implementations, the interlocking feature is machined into the airfoil a distance from the tip that is at least about twenty percent (20%) of the span.

At (304), the method (300) includes joining a replacement core with the airfoil, wherein the replacement core comprises an interlocking feature complementary to the interlocking feature of the airfoil, and wherein when the replacement core is joined with the airfoil, the interlocking features of the replacement core and the airfoil interlock to form a joint. For example, the replacement core can be the replacement core 130 as depicted and described herein. The replacement core 130 can include interlocking feature 144 illustrated and described herein as well. The interlocking feature 144 of the replacement core 130 can be complementary to the interlocking feature 116 of the airfoil. For example, the interlocking features 116, 144 of the airfoil 100 and the replacement core 130 can both have dovetail configurations 118, 146, as shown in FIG. 4. The joint formed by the interlocking features can be joint 160 as shown in FIG. 5.

In some implementations, the airfoil defines a chord length extending between a leading edge and a trailing edge and wherein the replacement core defines a chord length extending between a leading edge and a trailing edge of the replacement core, and wherein the interlocking features of the replacement core and the airfoil extend substantially along the chord length. In some embodiments, the interlocking features of the replacement core and the airfoil extend along their entire respective chord lengths. In some implementations, the interlocking features of the replacement core and the airfoil extend along their entire respective camber lines.

At (306), the method (300) includes overlaying the joint with one or more plies. For instance, one or more plies 170 as shown in FIGS. 6 and 7 can overlay the joint 160 formed by the interlocking features 116, 144 of the airfoil 100 and replacement core 130, respectively. By overlaying plies 170 over the joint 160, the airfoil can be rebuilt or recontoured to a predetermined geometry or desired shape, the plies 170 can provide improved shear and tensile strength to the repaired airfoil and act to seal the joint 160. In some implementations, any excess material of the plies 170 can be finish machined from the repaired airfoil such that the airfoil is formed to a predetermined geometry, the predetermined geometry being indicative of a desired shape of the airfoil. Moreover, in some implementations, to ensure a secure connection between the replacement core 130 and the airfoil 100, at least one of the one or more plies 170 overlaying the joint 160 is connected to both the replacement core 130 and the airfoil 100.

In yet other implementations, the joint defines a joint width, and wherein at least one of the one or more plies extends from a center of the joint width in a first direction a distance equal to the joint width and extends from the center of the joint width in a second direction a distance equal to the joint width, the first direction opposite the second direction.

In some implementations, after overlaying the joint with one or more plies, the method further includes bonding the replacement core with the airfoil, wherein during bonding, the replacement core and the airfoil are chemically bonded to one another along at least a portion of the joint and the one or more plies are chemically bonded to one another and at least one of the plies is chemically bonded to both the airfoil and the replacement core. In such implementations, bonding can include inserting the joined airfoil and replacement core and the one or more plies overlaying the joint into an autoclave for a predetermined time or until the joined components reach a predetermined temperature. Bonding can also include inserting the joined airfoil and replacement core and the one or more plies overlaying the joint into a furnace for a predetermined time or until the joined components reach a predetermined temperature. The joined components can be chemically bonded at their matrix cured interfaces, for instance.

In some implementations, prior to overlaying the joint with the one or more plies, the method further includes forming one or more cooling holes in the replacement core. For example, the replacement core 130 can have cooling holes 148 preformed or already defined in replacement core 130 prior to being overlaid by plies 170. This can, for example, reduce scrap cores and plies as the holes can more easily be formed before subjecting the repaired airfoil to one or more bonding processes.

In some implementations, the airfoil is formed from a CMC material and the airfoil is configured for use in a gas turbine engine. In some implementations, the airfoil is formed from a PMC material and the airfoil is configured for use in a gas turbine engine.

Figure 12:
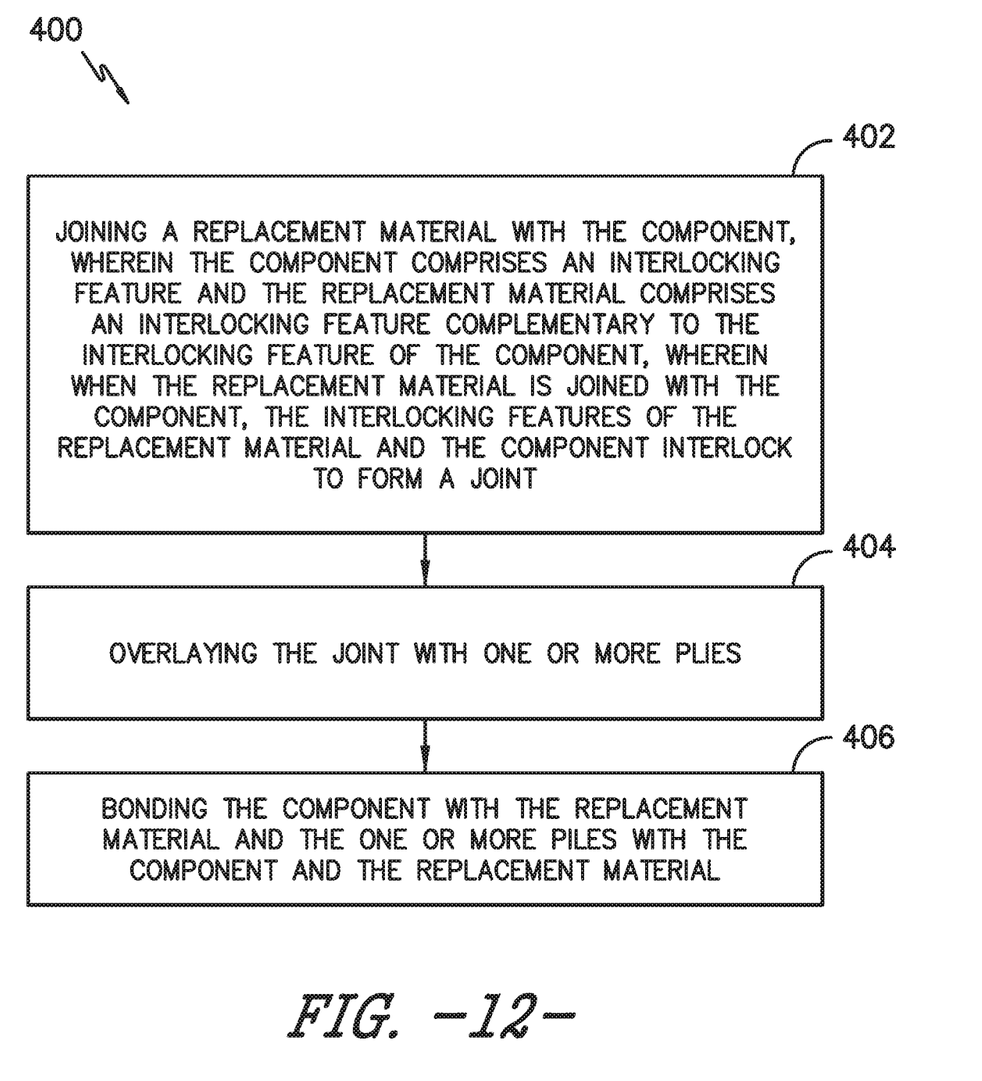
FIG. 12 provides a flow diagram of another exemplary method according to an exemplary embodiment of the present subject matter.

FIG. 12 provides a flow diagram of an exemplary method according to an exemplary embodiment of the present subject matter. In particular, FIG. 12 provides a flow diagram for a method for repairing a component formed from a composite material, such as e.g., a CMC or PMC material.

At (402), the method (400) includes joining a replacement material with the component, wherein the component comprises an interlocking feature and the replacement material comprises an interlocking feature complementary to the interlocking feature of the component, wherein when the replacement material is joined with the component, the interlocking features of the replacement material and the component interlock to form a joint. For instance, the component can be the airfoil 100 and the replacement material can be the replacement core 130 illustrated and described herein. The interlocking feature for the component can be the interlocking feature 116 shown and described herein for airfoil 100. For example, the interlocking feature 116 can be dovetails 118 (rounded as shown in FIG. 4 or flaring as shown in FIG. 8), finger projections 150 as shown in FIG. 9, fir trees 154 as shown in FIG. 10, a combination of the foregoing, etc. Likewise the interlocking feature of the replacement material can be the interlocking feature 144 shown and described herein for replacement core 130.

At (404), the method (400) includes overlaying the joint with one or more plies. For instance, one or more plies 170 as shown in FIGS. 6 and 7 can overlay the joint 160 formed by the interlocking features 116, 144 of the airfoil 100 and replacement core 130, respectively. By overlaying plies 170 over the joint 160, the airfoil can be rebuilt or recontoured to a predetermined geometry or desired shape, the plies 170 can provide improved shear and tensile strength to the repaired airfoil and act to seal the joint 160.

At (406), the method (400) includes bonding the component with the replacement material and the one or more plies with the component and the replacement material. For example, after overlaying the joint with one or more plies, the method further includes bonding the replacement core with the airfoil, wherein during bonding, the replacement core and the airfoil are chemically bonded to one another along at least a portion of the joint and the one or more plies are chemically bonded to one another and at least one of the plies is chemically bonded to both the airfoil and the replacement core. In such implementations, bonding can include inserting the joined airfoil and replacement core and the one or more plies overlaying the joint into an autoclave for a predetermined time or until the joined components reach a predetermined temperature. Bonding can also include inserting the joined airfoil and replacement core and the one or more plies overlaying the joint into a furnace for a predetermined time or until the joined components reach a predetermined temperature.

In some implementations, the component is formed from a CMC material and is configured for use in a gas turbine engine. In some other implementations, the component is formed from a PMC material and is configured for use in a gas turbine engine. In addition, exemplary implementations described above with reference to method (300) are equally applicable to method (400).

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for repairing a component having a damaged region, the component formed from a composite material and defining a span length that extends from a first end of the component to a second end of the component, and a reference line that is defined midway between the first end and the second end, the damaged region being closer to the second end than the first end, wherein the component is an airfoil for use in a gas turbine engine, the method comprising:
    joining a replacement material with the component, the replacement material having a tip end, a connection end, a leading edge, and a trailing edge, wherein the component comprises an interlocking feature and the connection end of the replacement material comprises an interlocking feature complementary to the interlocking feature of the component, wherein when the replacement material is joined with the component, the interlocking features of the replacement material and the component interlock to form a joint that defines a joint width and a joint length, the joint width being perpendicular to the joint length and the joint length spanning a width of the component;
    overlaying the joint with a plurality of plies, wherein overlaying the joint comprises laying a first ply over the joint on a pressure side of the airfoil and laying a second ply over the joint on a suction side of the airfoil; and
    bonding the component with the replacement material and bonding the plurality of plies with the component and the replacement material;
    wherein the joint is only between the reference line and the first end of the component;
    wherein the first ply extends beyond the leading edge of the replacement material;
    wherein overlaying the joint with a plurality of plies comprises laying one or more ply layers on the pressure side of the airfoil and laying one or more ply layers on the suction side of the airfoil, wherein the number of ply layers on the pressure side of the airfoil does not equal the number of ply layers on the suction side of the airfoil.

2. The method of claim 1, wherein at least one of the plurality of plies extends from a center of the joint width in a first direction a distance equal to the joint width and extends from the center of the joint width in a second direction a distance equal to the joint width, the first direction opposite the second direction.

3. The method of claim 1, wherein the component is formed from a polymer matrix composite (PMC) material.

4. The method of claim 1, wherein the interlocking feature of the component is one or more dovetails and the interlocking feature of the replacement material is one or more dovetails.

5. The method of claim 1, wherein the interlocking feature of the component and the interlocking feature of the replacement material are configured to counteract tensile forces.

6. The method of claim 1, wherein the interlocking feature of the component and the interlocking feature of the replacement material are configured to counteract shear forces.

7. The method of claim 1, wherein the step of bonding comprises inserting the component, the replacement material, and the plurality of plies in an autoclave to cause the component to chemically bond with the replacement material and the plurality of plies to chemically bond with the component and the replacement material.

8. The method of claim 1, wherein the first ply mates with the second ply.

9. The method of claim 1, wherein at least one of the plurality of plies has a different length than another one of the plurality of plies.

10. The method of claim 1, further comprising machining the component and the replacement material after boding the component with the replacement material.

* * * * *